(12) United States Patent
Hong et al.

(10) Patent No.: US 9,204,517 B2
(45) Date of Patent: Dec. 1, 2015

(54) LIGHT EMITTING DEVICE DRIVING APPARATUS AND ILLUMINATION SYSTEM INCLUDING THE SAME

(71) Applicant: Dongbu Hitek Co., Ltd., Gyeonggi-do (KR)

(72) Inventors: Seung Hun Hong, Gyeonggi-do (KR); Wan Gyu Kang, Gyeonggi-do (KR)

(73) Assignee: Dongbu Hitek Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/320,868

(22) Filed: Jul. 1, 2014

(65) Prior Publication Data

US 2015/0289341 A1 Oct. 8, 2015

(30) Foreign Application Priority Data

Apr. 7, 2014 (KR) ........................ 10-2014-0041228

(51) Int. Cl.
 *H05B 37/02* (2006.01)
 *H05B 33/08* (2006.01)
(52) U.S. Cl.
 CPC ........ *H05B 33/0887* (2013.01); *H05B 33/0812* (2013.01)
(58) Field of Classification Search
 CPC .......................... H05B 37/02; H05B 33/0884
 USPC ......... 315/122, 193, 294, 297, 307, 210, 226, 315/299
 See application file for complete search history.

(56) References Cited

U.S. PATENT DOCUMENTS

| | | | | |
|---|---|---|---|---|
| 7,564,198 B2 * | 7/2009 | Yamamoto et al. | ........... | 315/307 |
| 8,164,276 B2 * | 4/2012 | Kuwabara | ...................... | 315/294 |
| 8,928,247 B2 * | 1/2015 | Cheon et al. | ................... | 315/291 |
| 9,018,856 B2 * | 4/2015 | Jeong | ............................ | 315/294 |

FOREIGN PATENT DOCUMENTS

| | | |
|---|---|---|
| KR | 10-1999-0065308 A | 8/1999 |
| KR | 10-1068075 B | 9/2011 |
| KR | 10-2012-0053783 A | 5/2012 |
| KR | 10-2013-0035488 A | 4/2013 |

OTHER PUBLICATIONS

Office Action from corresponding Korean Patent Application No. 10-2014-0041228, dated Sep. 23, 2015.

* cited by examiner

*Primary Examiner* — Daniel D Chang
(74) *Attorney, Agent, or Firm* — Alston & Bird LLP

(57) ABSTRACT

Disclosed is a light emitting device driving apparatus for controlling a light emitting unit including series-connected light emitting device arrays. The apparatus includes a rectifier for rectifying an AC signal, and outputting a ripple current signal according to a result of the rectification, a current adjuster for outputting a selection voltage, and a sequential driving controller connected to channel lines connected to respective output terminals of the light emitting device arrays, the sequential driving controller selectively establishing current paths between the light emitting device arrays and the channel lines, based on a voltage level of the ripple current signal, and adjusting an intensity of current flowing through the channel lines, based on the selection voltage. The current adjuster performs analog-digital conversion upon a setting voltage, generates a digital value according to a result of the analog-digital conversion, and outputs one of a plurality of selective voltages, based on the digital value.

17 Claims, 7 Drawing Sheets

LIGHT EMITTING DEVICE DRIVING APPARATUS AND ILLUMINATION SYSTEM INCLUDING THE SAME

This application claims the benefit of the Korean Patent Application No. 10-2014-0041228, filed on Apr. 7, 2014, which is hereby incorporated by reference in its entirety as if fully set forth herein.

BACKGROUND OF THE INVENTION

1. Field of the Invention

Embodiments relate to a light emitting device driving apparatus and an illumination system.

2. Discussion of the Related Art

In accordance with development of semiconductor technologies, efficiency of light emitting diodes (LEDs) has been greatly enhanced. Compared to fluorescent and incandescent light sources, LEDs are comparatively economical and environmentally friendly due to their long lifespan and low energy consumption. By virtue of such advantages, LEDs are increasingly commonly used as a backlight for flat panel display devices such as liquid crystal displays (LCDs) or as signal lamps.

Generally, when LEDs are used as a lighting device, a plurality of LEDs is connected in series or in parallel, and turning-on/off thereof is controlled by a light emitting device control apparatus.

Generally, light emitting device control apparatuses that controls a plurality of LEDs rectify alternating current (AC) voltage into ripple voltage and control turning-on/off of the plurality of LEDs using the rectified ripple voltage.

SUMMARY OF THE INVENTION

Embodiments provide a light emitting device driving apparatus which is capable of protecting a switch, achieving an improvement in AC power noise tolerance, preventing an illumination system from being turned off or flickering in an abnormal situation such as a fire, and enabling the illumination system to emit a normal amount of light when turned on after being turned off.

Additional advantages, objects, and features of the embodiments will be set forth in part in the description which follows and in part will become apparent to those having ordinary skill in the art upon examination of the following or may be learned from practice of the embodiments. The objectives and other advantages of the embodiments may be realized and attained by the structure particularly pointed out in the written description and claims hereof as well as the appended drawings.

To achieve these objects and other advantages and in accordance with the purpose of the embodiments, as embodied and broadly described herein, a light emitting device driving apparatus for controlling a light emitting unit including light emitting device arrays connected in series includes a rectifier for rectifying an AC signal and outputting a ripple current signal according to a result of the rectification, a current adjuster for outputting a selection voltage, and a sequential driving controller connected to channel lines connected to respective output terminals of the light emitting device arrays The sequential driving controller selectively establishes current paths between the light emitting device arrays and the channel lines based on a voltage level of the ripple current signal, and adjusts an intensity of current flowing through the channel lines based on the selection voltage. The current adjuster performs analog-digital conversion upon a setting voltage, generates a digital value according to a result of the analog-digital conversion, and outputs one of a plurality of selective voltages as the selection voltage based on the digital value.

The light emitting device driving apparatus may further include a power supply for receiving the ripple current signal and generating an internal voltage and the plurality of selective voltages.

The setting voltage may be a voltage divided from the internal voltage, and the divided voltage is generated, based on an external resistor.

The current adjuster may include an external resistor connection terminal connected to an external resistor, and an internal resistor connected, at one end thereof, to the external resistor connection terminal while being connected. The internal resistor may receive the internal voltage at the other end thereof. The current adjuster may further include an analog-digital converter for performing analog-digital conversion upon the setting voltage and generating the digital value. The current adjuster may also include a selector for selecting one of the plurality of selective voltages based on the digital value, and outputting the selected voltage. The setting voltage may be a voltage divided from the internal voltage in accordance with a voltage division ratio between the external resistor and the internal resistor.

In another aspect, a light emitting device driving apparatus for controlling a light emitting unit including light emitting device arrays connected in series includes a rectifier for rectifying an AC signal and outputting a ripple current signal according to a result of the rectification. The light emitting device driving apparatus also includes a sequential driving controller comprising switches connected to respective output terminals of the light emitting device arrays based on a voltage level of the ripple current signal and amplifiers for controlling the switches. The light emitting device driving apparatus also includes a protection circuit for comparing, with a predetermined reference voltage, the voltage level of the ripple current signal at a time when the ripple current signal is supplied to the light emitting unit or the supply of the ripple current signal is cut off, and enabling or disabling the amplifiers in accordance with a result of the comparison.

The protection circuit may enable the amplifiers in accordance with a first order when the voltage level of the ripple current signal is equal to or higher than a predetermined first reference voltage, but lower than or equal to a predetermined second reference voltage at a time when the ripple current signal is supplied to the light emitting unit. The first order may be reverse to a second order. The second order may be a sequential arrangement order of the amplifiers corresponding to the series-connected light emitting arrays.

The protection circuit may disable all of the amplifiers when the voltage level of the ripple current signal is lower than the predetermined first reference voltage or higher than the predetermined second reference voltage.

The predetermined first reference voltage may be higher than an operating voltage of one of the light emitting device arrays. The predetermined second reference voltage may be lower than a sum of operating voltages of the light emitting device arrays.

The protection circuit may disable the amplifiers in accordance with a predetermined second order when the voltage level of the ripple current signal is lower than the predetermined first reference voltage, but higher than the predetermined second reference voltage at a time when the supply of the ripple current signal is cut off. The predetermined second order may be a sequential arrangement order of the amplifiers corresponding to the series-connected light emitting device arrays.

The light emitting device driving apparatus may further include a power supply for receiving the ripple current signal and generating an internal voltage and the plurality of selective voltages.

The light emitting device driving apparatus may further include a current adjuster for performing analog-digital conversion upon a setting voltage, generating a digital value according to a result of the analog-digital conversion, and outputting one of the plurality of selective voltages as a selection voltage, based on the digital value.

The sequential driving controller may further include a sensing resistor connected to a first node. Each of the switches may include a source connected to the first node, a drain connected to a corresponding one of the output terminals of the light emitting device arrays, and a gate controlled by a corresponding one of the amplifiers.

Each of the amplifiers may include a first input terminal connected to the first node, a second input terminal, to which a corresponding one of a plurality of reference voltages having different levels, and an output terminal for comparing a voltage at the first input terminal and a voltage at the second input terminal, and outputting a comparison signal according to a result of the comparison.

The sequential driving controller may further include a reference voltage generator for generating the plurality of reference voltages having different levels based on the selection voltage output from the current adjuster.

A predetermined time difference may be present between neighboring enable timing points of the amplifiers. The predetermined time difference may be 1 to 4 microseconds.

The light emitting device driving apparatus may further include a temperature adapter comprising a temperature sensing transistor having a base-emitter voltage varying in accordance with a variation in temperature. The temperature adapter may output a thermal shutdown signal based on the base-emitter voltage of the temperature sensing transistor and the internal voltage. The current adjuster may selectively output one of the plurality of selective voltages based on the thermal shutdown signal.

The temperature adapter may further include a comparator for comparing the base-emitter voltage of the temperature sensing transistor with a first voltage and outputting a temperature sensing signal according to a result of the comparison. The temperature adapter may also include a D-flip-flop for receiving the internal voltage and outputting the received internal voltage in response to the temperature sensing signal. The temperature adapter may further include a logic gate for logically operating the output from the D-flip-flop and the temperature sensing signal and outputting the thermal shutdown signal in accordance with a result of the logical operation.

The logic gate may be an OR gate.

In another aspect, an illumination system includes a light emitting unit comprising light emitting device arrays connected in series and a light emitting device driving apparatus for controlling the light emitting unit. The light emitting device driving apparatus is a light emitting device driving apparatus according to one of the above-described aspects.

In accordance with embodiments, it may be possible to protect a switch to achieve an improvement in AC power noise tolerance, to prevent an illumination system from being turned off or flickering in an abnormal situation such as a fire, and to enable the illumination system to emit a normal amount of light when turned on after turning-off thereof.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF THE INVENTION

Figure 1:
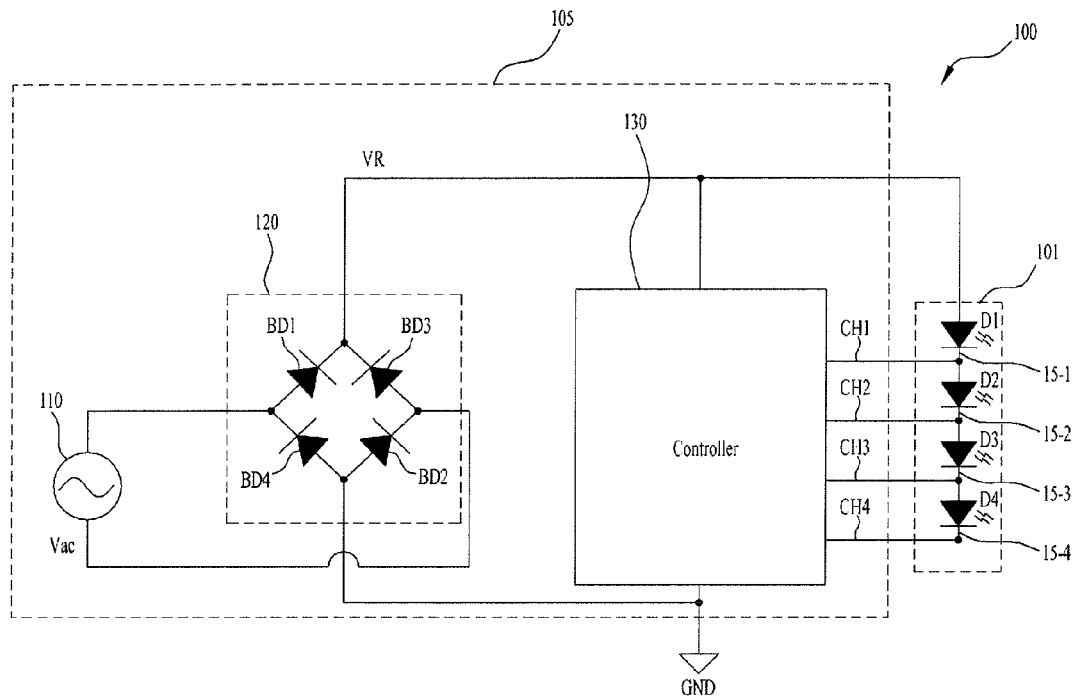
FIG. 1 is a block diagram illustrating an illumination system according to an embodiment.

Hereinafter, embodiments will be described in detail with reference to the annexed drawings for better understanding. In the following description of the embodiments, it will be understood that, when an element such as a layer (film), region, pattern, or structure is referred to as being "on" or "under" another element, it can be directly on or under another element or can be indirectly formed such that an intervening element is also present. In addition, terms such as "on" or "under" should be understood on the basis of the drawings.

In the drawings, dimensions of layers are exaggerated, omitted or schematically illustrated for clarity and convenience of description. In addition, dimensions of constituent elements do not entirely reflect actual dimensions thereof. The same reference numerals denote the same constituent elements.

FIG. 1 is a block diagram illustrating an illumination system 100 according to an embodiment.

Referring to FIG. 1, the illumination system 100 includes a light emitting unit 101, and a light emitting device driving unit 105 for controlling operation of the light emitting unit 101.

The light emitting unit 101 includes a plurality of light emitting device arrays connected in series. For example, the light emitting unit 101 may include first to fourth light emitting device arrays D1 to D4 sequentially connected in series.

Although four light emitting device arrays are illustrated in FIG. 1, the number of light emitting device arrays is not limited thereto.

Each of the plurality of light emitting arrays, for example, D1 to D4, may include at least one light emitting diode (LED).

When each light emitting device array includes a plurality of LEDs, the plurality of LEDs may be connected in series, in parallel, or in series and parallel.

The light emitting device driving unit 105 controls turning-on/off of the light emitting device arrays D1 to D4.

The light emitting device driving unit 105 may include an AC power source 110, a rectifier 120, a controller 130, and channel lines CH1 to CH4.

The AC power source 110 supplies an AC signal Vac to the rectifier 120.

Figure 8:
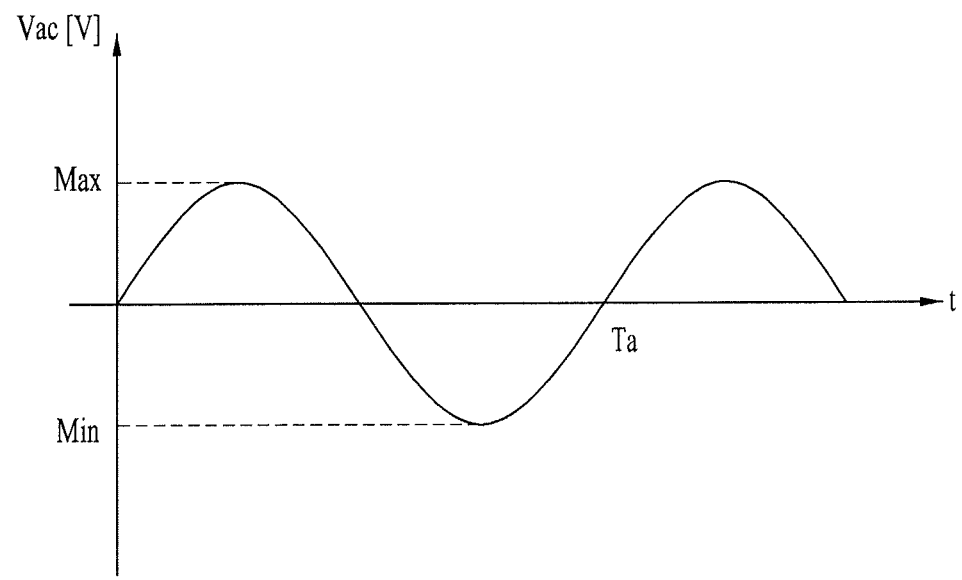
FIG. 8 is a waveform diagram of an AC signal supplied from an AC power source illustrated in FIG. 1.

Referring now to FIG. 8, FIG. 8 depicts a waveform diagram of the AC signal Vac supplied from the AC power source 110 illustrated in FIG. 1.

As illustrated in FIG. 8, the AC signal Vac may be a sine or cosine wave having a maximum value of MAX and a minimum value of MIN while having a period Ta. It should be appreciated that the AC signal Vac is not necessarily limited to the above-described waveform.

For example, the AC signal Vac may be an AC voltage having a frequency of 50 to 60 Hz. It should be appreciated that the AC signal Vac is not necessarily limited to the AC voltage having a frequency of 50 to 60 Hz.

Returning to FIG. 1, the light emitting device driving unit 105 may further include a fuse connected between the AC power source 110 and the rectifier 120. When an AC signal momentarily has an excessive voltage level, the fuse may be shorted, thereby protecting the light emitting device driving unit 105 from the excessively high AC signal.

The rectifier 120 rectifies the AC signal Vac supplied from the AC power source 110 and outputs a ripple current signal VR generated in accordance with the rectification.

The rectifier 120 may be implemented as a bridge diode circuit including four diodes BD1, BD2, BD3, and BD4 connected by a bridge structure. It should be appreciated that the rectifier 120 is not necessarily limited to the above-described bridge diode circuit.

Figure 9:
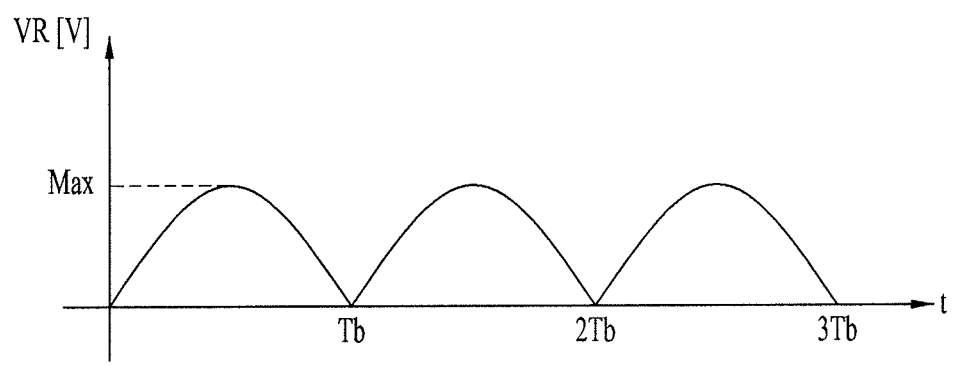
FIG. 9 is a waveform diagram illustrating an embodiment of a ripple current signal output from a rectifier illustrated in FIG. 1.

The rectifier 120 may perform full-wave rectification for the AC signal Vac illustrated in FIG. 8 and, as such, may output a ripple current signal VR which is a full-wave rectified AC signal as illustrated in FIG. 9. Hereinafter, the AC signal full-wave rectified by the rectifier 120 will be referred to as a "ripple current signal VR".

The ripple current signal VR output from the rectifier 120 is applied to the light emitting unit 101. For example, the ripple current signal VR may be applied to a first input stage of the series-connected light emitting device arrays, such as an input stage of the first light emitting device array D1.

Turning now to FIG. 9, FIG. 9 illustrates an embodiment of the ripple current signal VR output from the rectifier 120 illustrated in FIG. 1.

Referring to FIG. 9, the ripple current signal VR may be a sine or cosine wave having a maximum value of MAX and a minimum value of 0 while having a period Tb. It should be appreciated that the ripple current signal VR is not necessarily limited to the above-described waveform. The period Tb of the ripple current signal VR may be a half the period Ta of the AC signal Vac (Tb=Ta/2).

Returning to FIG. 1, the controller 130 controls turning-on and turning-off of the series-connected light emitting device arrays D1 to D4 of the light emitting unit 101 based on the ripple current signal VR supplied from the rectifier 120.

The channel lines CH1 to CH4 may be connected between respective output terminals 15-1 to 15-4 of the light emitting device arrays D1 to D4 and the controller 130. Each of the channel lines CH1 to CH4 may be connected to a corresponding one of the output terminals 15-1 to 15-4 of the light emitting device arrays D1 to D4.

Each of the channel lines CH1 to CH4 may establish a current path between the corresponding one of the output terminals 15-1 to 15-4 of the light emitting device arrays D1 to D4 and the controller 130.

When each of the light emitting device arrays D1 to D4 includes a plurality of LEDs connected in series, the output terminal of the light emitting device array D1, D2, D3 or D4 may be an output terminal of a last one of the plurality of LEDs connected in series.

Figure 2:
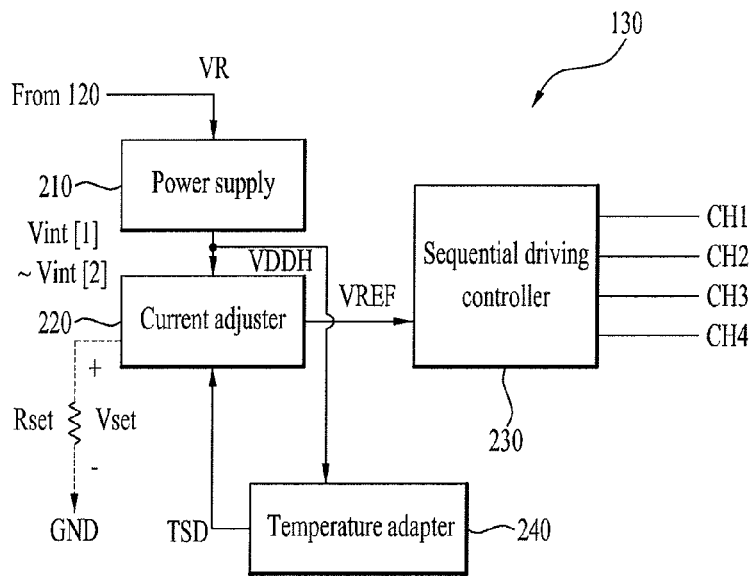
FIG. 2 is a block diagram illustrating an embodiment of a controller illustrated in FIG. 1.

FIG. 2 is a block diagram illustrating an embodiment of the controller 130 illustrated in FIG. 1.

Referring to FIG. 2, the controller 130 may include a power supply 210, a current adjuster 220, a sequential driving controller 230, and a temperature adapter 240.

The power supply 210 receives the ripple current signal VR and generates an internal voltage VDDH and selective voltages Vint[1] to Vint[n] where n is a natural number greater than 1 (n>1).

For example, the power supply 210 may receive the ripple current signal VR, and may generate the internal voltage VDDH, which is a constant voltage, based on the received ripple current signal VR. Using the internal voltage VDDH, the power supply 210 may generate a plurality of selective voltages Vint[1] to Vint[n] having different levels.

Figure 3:
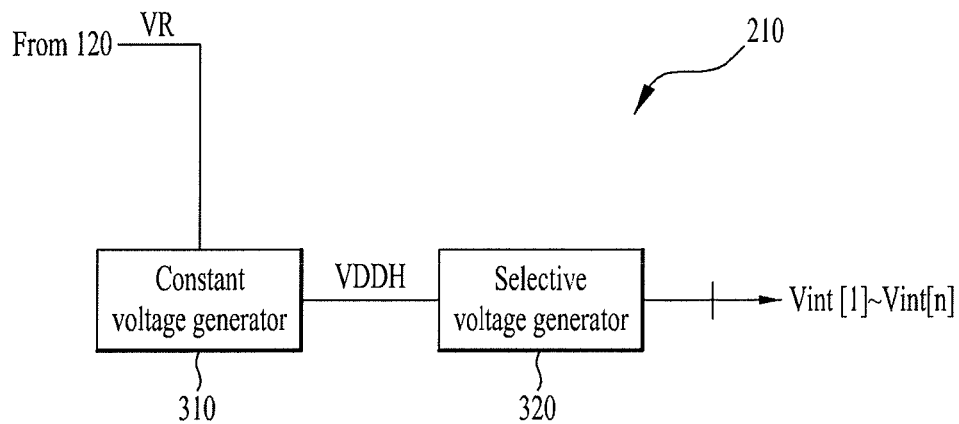
FIG. 3 is a diagram illustrating an embodiment of a power supply illustrated in FIG. 2.

FIG. 3 illustrates an embodiment of the power supply 210 illustrated in FIG. 2.

Referring to FIG. 3, the power supply 210 may include a constant voltage generator 310 and a selective voltage generator 330.

The constant voltage generator 310 may generate the internal voltage VDDH, which is a constant voltage, based on the ripple current signal VR. For example, the constant voltage generator 320 may be implemented as a resistor or a transistor (for example, a MOS transistor), and a constant voltage regulator connected thereto. It should be appreciated that the constant voltage generator 310 is not necessarily limited to the above-described configuration.

The selective voltage generator 330 may generate a plurality of selective voltages Vint[1] to Vint[n] having different levels, based on the internal voltage VDDH generated by the constant voltage generator 320.

The current adjuster 220 may adjust the intensity of current flowing through the light emitting unit 101.

The current adjuster 220 generates a setting voltage Vset, performs analog-digital conversion upon the generated setting voltage Vset, generates a digital value DS according to the result of analog-digital conversion, selects one of the selective voltages Vint[1] to Vint[n] based on the digital value DS, and outputs a selection voltage VREF according to the result of the selection. In this case, the setting voltage Vset may be generated based on a resistance of an external resistor Rset or may be a voltage divided from the internal voltage VDDH.

Alternatively, the current adjuster 220 may output the selection voltage VREF, based on a thermal shutdown signal TSD supplied from the temperature adapter, which will be described later.

For example, when the thermal shutdown signal TSD has a first level (for example, a low level), the current adjuster 220 may output, as the selection voltage VREF, a lowest one of the plurality of selective voltages Vint[1] to Vint[n].

On the other hand, when the thermal shutdown signal TSD has a second level (for example, a high level), the current adjuster 220 does not participate in voltage selection. That is, when the thermal shutdown signal TSD has a second level (for example, a high level), the current adjuster 220 may select one of the plurality of selective voltages Vint[1] to Vint[n], based on the digital value DS, and may output a selection voltage VREF according to the result of selection.

Figure 4:
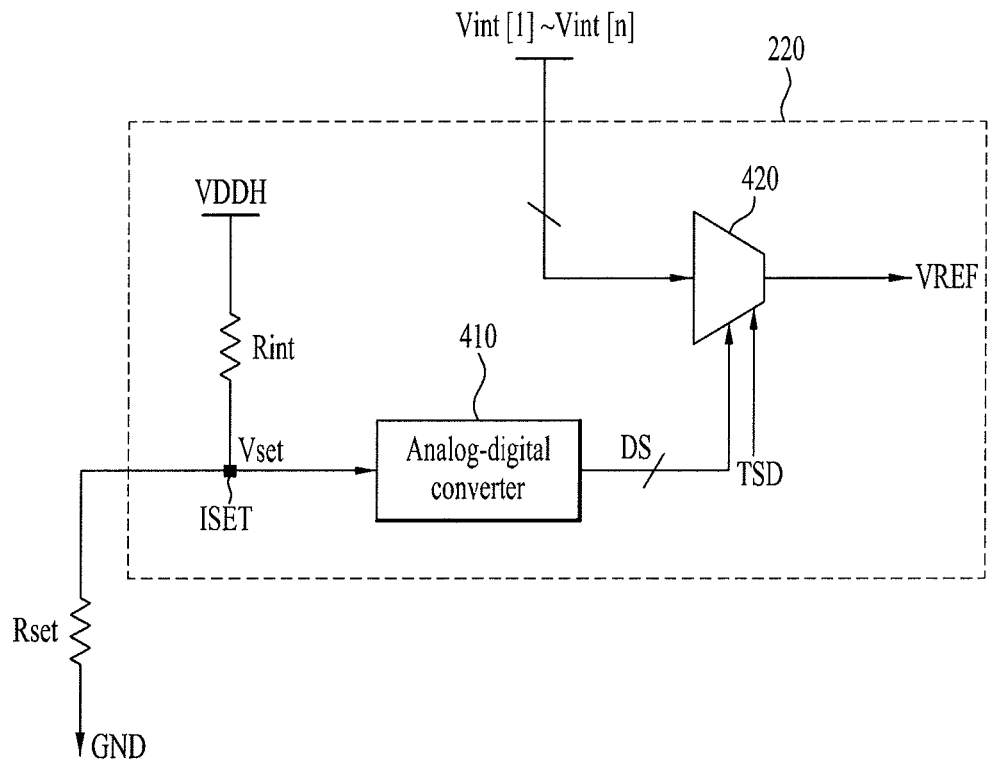
FIG. 4 is a diagram illustrating a configuration of a current adjuster illustrated in FIG. 2.

FIG. 4 illustrates a diagram of a configuration of the current adjuster 220.

Referring to FIG. 4, the current adjuster 220 may include an external resistor connection terminal ISET, an internal resistor Rint, an analog-digital converter 410, and a selector 420.

The external resistor Rset may be connected to the external resistor connection terminal ISET.

For example, the external resistor Rset may be connected, at one end thereof, to the external resistor connection terminal ISET while being connected, at the other end thereof, to a ground GND.

The internal resistor Rint may be connected, at one end thereof, to the external resistor connection terminal ISET. The internal voltage VDDH supplied from the power supply 210 may be applied to the other end of the internal resistor Rint.

The setting voltage Vset may be a voltage across the external resistor Rset or a voltage at the external resistor connection terminal ISET. For example, the setting voltage Vset may be a voltage divided from the internal voltage VDDH in accordance with a voltage division ratio between the external resistor Rset and the internal resistor Rint (Vset=VDDH× Rset/(Rset+Rint). That is, the setting voltage Vset may be determined by the resistance of the external resistor Rset.

The analog-digital converter 410 performs analog-digital conversion for the setting voltage Vset, and outputs a digital value DS according to the result of conversion.

The selector 420 selects one of the selective voltages Vint [1] to Vint[n] supplied from the power supply 210 based on the digital value DS, and outputs a selection voltage VREF according to the result of selection.

Alternatively, the selector 420 may select one of the selective voltages Vint[1] to Vint[n], based on the thermal shutdown signal TSD, and may output a selection voltage VREF according to the result of selection.

For example, when the thermal shutdown signal TSD has the first level (for example, the low level), the selector 420 may output, as the selection voltage VREF, the lowest one of the plurality of selective voltages Vint[1] to Vint[n]. On the other hand, when the thermal shutdown signal TSD has the second level (for example, a higher level), the selector 420 may select one of the plurality of selective voltages Vint[1] to Vint[n], based on the digital value DS, and may output a selection voltage VREF according to the result of selection.

The setting voltage Vset may be determined by the external resistor Rset. The selection voltage VREF may be selected, based on the digital value DS according to the result obtained through analog-digital conversion of the setting voltage Vset. Based on the selection voltage VREF, an intensity of current flowing through the light emitting unit 101 may be determined.

Since the external resistor Rest is used only to select the selection voltage VREF in this embodiment, there is no influence on the selection voltage VREF even when AC power noise (for example, fluctuation noise) flows into the external resistor Rset.

In some embodiments, it may be possible to adjust current flowing through the light emitting unit 101 without any influence of noise (for example, current fluctuation entering through the external resistor Rset).

In brief, in some embodiments, the selection voltage VREF is determined by converting the voltage across the external resistor Rset into a digital value by the analog-digital converter 620, and then selecting one of the selective voltages Vint[1] to Vint[n] based on the digital value. As such, it may be possible to adjust current flowing through the light emitting unit 101 without any influence of AC power noise.

Alternatively, the selection voltage VREF may be selected based on the thermal shutdown signal TSD, and an intensity of current flowing through the light emitting unit 101 may be selected based on the selection voltage VREF. In this case, accordingly, it may be possible to control a brightness of the light emitting unit 101 in accordance with temperature variation of the illumination system 100.

The sequential driving controller 230 may sequentially drive the light emitting device arrays D1 to D4 of the light emitting unit 101, based on the voltage level of the ripple current signal VR.

For example, the sequential driving controller 230 may allow current from the light emitting unit 101 into one of the first to fourth channels CH1 to CH4 based on the voltage level of the ripple current signal VR.

Figure 5:
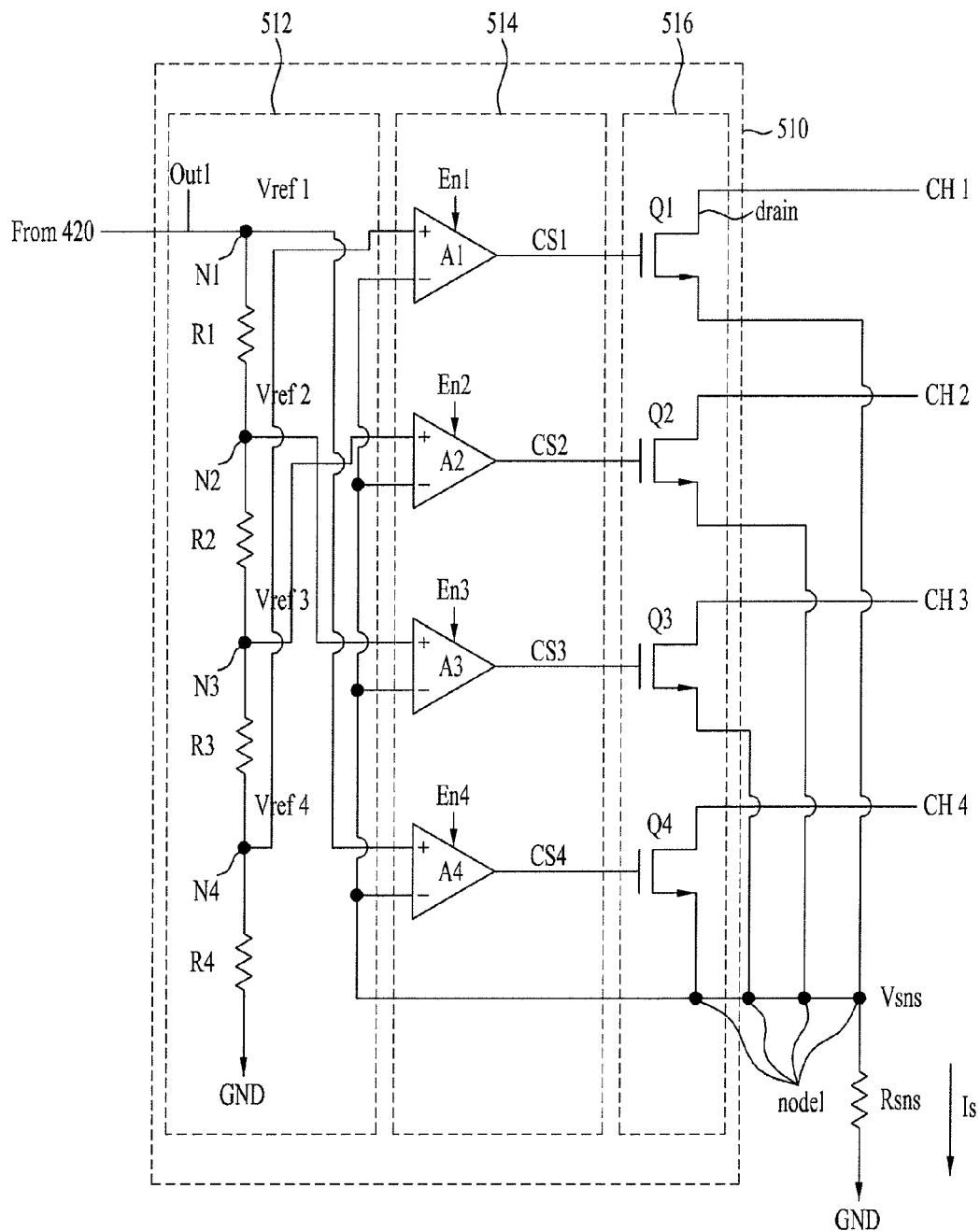
FIG. 5 is a diagram illustrating a configuration of a sequential driving controller illustrated in FIG. 2.

FIG. 5 illustrates a diagram of a configuration of the sequential driving controller 230 illustrated in FIG. 2.

Referring to FIG. 5, the sequential driving controller 230 includes a sensing resistor Rsns and a switching controller 510.

The sensing resistor Rsns is connected between the ground GND and a first node node1.

The switching controller 510 connects the first node node1 to one of the channel lines CH1 to CH4 based on the voltage level of the ripple current signal VR.

For example, the switching controller 510 may connect the first node node1 to one of the channel lines CH1 to CH4 based on the voltage level of the ripple current signal VR and, as such, may establish a current path between the connected channel line and the first node node1.

For example, the switching controller 510 may connect the first channel line CH1 to the first node node1 while electrically separating the remaining lines CH2 to CH4 from the first node node1 when the voltage level of the ripple current signal VR is equal to or higher than a first level LV1, but lower than a second level LV2. As the first channel line CH1 is connected to the first node node1, a first current path is established and, as such, only the first light emitting device array D1 is allowed to emit light.

In this case, a first switch Q1, which will be described later, functions as a constant current source by virtue of a first amplifier A1 and the sensing resistor Rsns. That is, a reference voltage Vref4 and a sensing voltage Vsns, which are applied to the first amplifier A1, may be equalized in accordance with a feedback function of the first amplifier A1 and, as such, current flowing through the sensing resistor Rsns may be Vref4/Rsns.

In addition, for example, the switching controller 510 may connect the second channel line CH2 to the first node node1 while electrically separating the remaining lines CH1, CH3, and CH4 from the first node node1 when the voltage level of the ripple current signal VR is equal to or higher than the second level LV2, but lower than a third level LV3. As the second channel line CH2 is connected to the first node node1 a second current path is established and, as such, only the first and second light emitting device arrays D1 and D2 are allowed to emit light.

In this case, a second switch Q2, which will be described later, functions as a constant current source by virtue of a second amplifier A2 and the sensing resistor Rsns. That is, a reference voltage Vref3 and a sensing voltage Vsns, which are applied to the second amplifier A2, may be equalized in accordance with a feedback function of the second amplifier A2 and, as such, current flowing through the sensing resistor Rsns may be Vref3/Rsns.

In addition, for example, the switching controller 510 may connect the third channel line CH3 to the first node node1 while electrically separating the remaining lines CH1, CH2, and CH4 from the first node node1 when the voltage level of the ripple current signal VR is equal to or higher than the third level LV3 but lower than a fourth level LV4. As the third channel line CH3 is connected to the first node node1, a third current path is established and, as such, only the first to third light emitting device arrays D1 to D3 are allowed to emit light.

In this case, a third switch Q3, which will be described later, functions as a constant current source by virtue of a third amplifier A3 and the sensing resistor Rsns. That is, a reference voltage Vref2 and a sensing voltage Vsns which are applied to the third amplifier A3, may be equalized in accordance with a feedback function of the third amplifier A3 and, as such, current flowing through the sensing resistor Rsns may be Vref2/Rsns.

In addition, for example, the switching controller 510 may connect the fourth channel line CH4 to the first node node1 while electrically separating the remaining lines CH1 to CH3 from the first node node1, when the voltage level of the ripple current signal VR is equal to or higher than the fourth level LV4. As the fourth channel line CH4 is connected to the first node node1 a fourth current path is established and, as such, all of the first to fourth light emitting device arrays D1 to D4 are allowed to emit light.

In this case, a fourth switch Q4, which will be described later, functions as a constant current source by virtue of a fourth amplifier A4 and the sensing resistor Rsns. That is, a reference voltage Vref1 and a sensing voltage Vsns, which are applied to the fourth amplifier A4, may be equalized in accordance with a feedback function of the fourth amplifier A4 and, as such, current flowing through the sensing resistor Rsns may be Vref1/Rsns.

In addition, for example, the switching controller 510 may electrically separate the first to fourth channel lines CH1 to CH4 from the first node node1, when the voltage level of the ripple current signal VR is lower than the first level LV1. As the first to fourth channel lines CH1 to CH4 are electrically separated from the first node node1, all of the first to fourth light emitting device arrays D1 to D4 are prevented from emitting light.

The switching controller 510 may include a reference voltage generator 512, an amplifying unit 514, and a switch unit 516.

The reference voltage generator 512 generates a plurality of reference voltages Vref1 to Vref4 having different levels, based on the selection voltage VREF output from the current adjuster 220.

For example, the reference voltage generator 512 may divide the selection voltage VREF and, as such, may generate a plurality of reference voltages Vref1 to Vref4 in accordance with the result of division.

To this end, the reference voltage generator 512 may include a plurality of divided resistors, for example, R1 to R4, connected in series to an output terminal OUT1 of the current adjuster 220, for example, an output terminal of the selector 420.

The first reference voltage Vref1 may be output to a node N1 between the output terminal OUT1 of the current adjuster 220 and the first resistor R1. The second reference voltage Vref2 may be output to a node N2 between the first resistor R1 and the second resistor R2. The third reference voltage Vref3 may be output to a node N3 between the second resistor R2 and the third resistor R3. The fourth reference voltage Vref4 may be output to a node N4 between the third resistor R3 and the fourth resistor R4.

The amplifying unit 514 receives the reference voltages Vref1 to Vref4 and a voltage across the sensing resistor Rsns, namely, the sensing voltage Vsns and, as such, outputs amplified signals CS1 to CS4.

For example, the amplifying unit 514 may compare each of the reference voltages Vref1 to Vref4 with the sensing voltage Vsns and may output a corresponding one of the amplified signals CS1 to CS4 in accordance with the result of the comparison.

The amplifying unit 514 may include a plurality of amplifiers A1 to A4. Each of the amplifiers A1 to A4 may function to allow constant current to flow through a corresponding one of the switches Q1 to Q4 in accordance with feedback control thereof.

Each of the amplifiers A1 to A4 may include a first input terminal (for example, a negative (−) input terminal) to receive the sensing voltage Vsns, a second input terminal (for example, a positive (+) input terminal) to receive a corresponding one of the reference voltages Vref1 to Vref4 and an output terminal to output a corresponding one of the amplified signals CS1 to CS4.

The first input terminal (for example, the negative (−) input terminal) of each of the amplifiers A1 to A4 may be connected to the first node node1.

The second input terminal (for example, the positive (+) input terminal) of each of the amplifiers A1 to A4 may be connected to a corresponding one of the first to fourth nodes N1 to N4.

The output terminal of each of the amplifiers A1 to A4 may be connected to a gate of a corresponding one of the switches Q1 to Q4. For example, each of the amplified signals CS1 to CS4 may be applied to the gate of the corresponding one of the switches Q1 to Q4.

For example, the first amplifier A1 may compare the sensing voltage Vsns with the fourth reference voltage Vref4 and, as such, may output the first amplified signal CS1. The second amplifier A2 may compare the sensing voltage Vsns with the third reference voltage Vref3 and, as such, may output the second amplified signal CS2. The third amplifier A3 may compare the sensing voltage Vsns with the second reference voltage Vref2 and, as such, may output the third amplified signal CS3. The fourth amplifier A4 may compare the sensing voltage Vsns with the first reference voltage Vref1 and, as such, may output the fourth amplified signal CS4. Each of the amplifiers A1 to A4 may be a differential amplifier, such as an operational amplifier. It should be appreciated that embodiments are not necessarily limited to the above-described case.

The switch unit 516 connects one of the first to fourth channels CH1 to CH4 to the sensing resistor Rsns, based on the amplified signals CS1 to CS4.

To this end, the switch unit 516 may include a plurality of switches Q1 to Q4 functioning as a channel between respective light emitting device arrays D1 to D4 and the sensing resistor Rsns.

Each of the switches Q1 to Q4 may be implemented as a transistor. In the case of FIG. 5, each switch is implemented as a field effect transistor, for example, an N-type metal-oxidesemiconductor (NMOS) transistor. It should be appreciated that embodiments are not necessarily limited to the above-described case.

Each of the switches Q1 to Q4 may include a gate to receive a corresponding one of the amplified signals CS1 to CS4, a drain connected to a corresponding one of the first to fourth channel lines CH1 to CH4, and a source connected to the first node node1.

For example, each of the switches Q1 to Q4 may include a gate controlled by a corresponding one of the amplifiers, a source connected to the first node node1, and a drain connected to a corresponding one of the output terminals of the light emitting device arrays.

The switches Q1 to Q4 may be turned on or off, based on the respective amplified signals CS1 to CS4.

Figure 10:
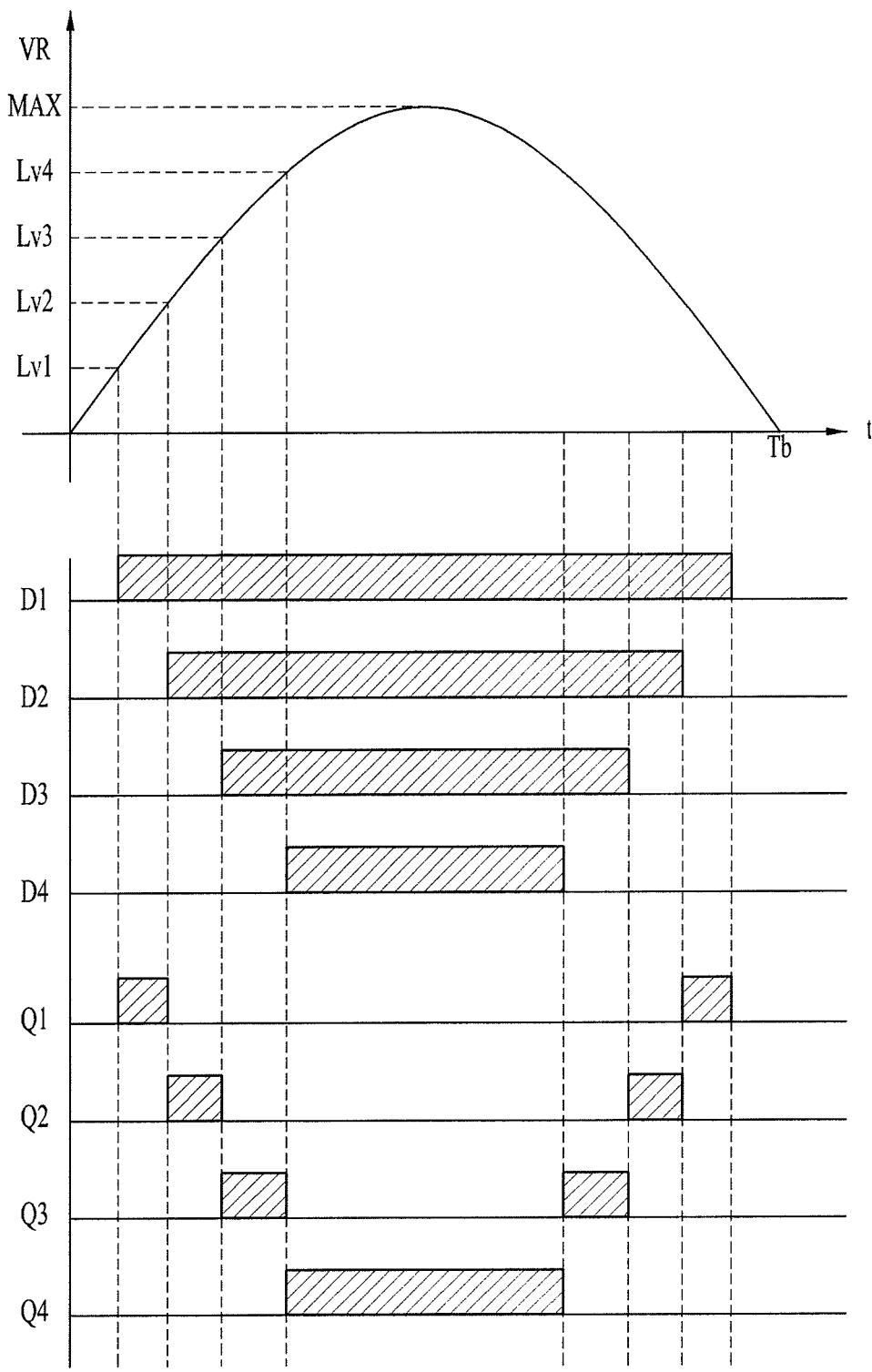
FIG. 10 is a graph depicting operation of a switching controller illustrated in FIG. 5.

Turning now to FIG. 10, FIG. 10 is a graph depicting operation of the switching controller 510 illustrated in FIG. 5.

As illustrated in FIG. 10, when the voltage level of the ripple current signal VR is lower than the first level LV1 (VR<LV1), all of the first to fourth switches Q1 to Q4 are turned off. In this case, the first to fourth light emitting arrays D1 to D4 are turned off, preventing emission of light. For example, the first level LV1 may be equal to a voltage, such as VF1, capable of operating one light emitting device array, such as D1 where LV1 is equal to VF1. Here, "VF1" may be an operating voltage of the first light emitting device.

When the voltage level of the ripple current signal VR is equal to or higher than the first level LV1, but lower than the second level LV2 (for example, LV1≤VR<LV2), the first switch D1 is turned on. In this case, a first drain voltage "VR-LV1" may be applied to the drain of the first switch Q1. Current flowing through the first light emitting device array D1 may flow through the first channel line CH1 and first switch Q1. For example, the second level LV2 may be a voltage (for example, LV2=VF1+VF2) capable of operating two light emitting device arrays (for example, D1 and D2). Here, "VF2" may be an operating voltage of the second light emitting device array.

The sensing voltage Vsns may be applied across the sensing resistor Rsns by current flowing through the first switch Q1. In this case, the first switch Q1 may function as a constant current source because the voltage at the first input terminal (for example, a negative (−) input terminal) of the first amplifier A1, namely, the voltage Vsns, is equal to the voltage at the second input terminal (for example, a positive (+) input terminal) of the first amplifier A1, namely, the voltage Vref4.

In this case, current flows only through the first switch Q1. This is because the second to fourth light emitting device arrays D2 to D4 cannot be turned on because the voltage level of the ripple current signal VR is lower than the second level LV2.

When the voltage level of the ripple current signal VR is equal to or higher than the second level LV2, but lower than the third level LV3 (for example, LV2≤VR<LV3), the first and second light emitting device arrays D1 and D2 are turned on and, as such, may emit light. In this case, a second drain voltage "VR-LV2" may be applied to the drain of the second switch Q2. Current flowing through the first and second light emitting device arrays D1 and D2 may flow through the second channel line CH2 and the second switch Q2.

In this case, no current flows through the first switch Q1. This is because the second switch Q2 is turned on, but the first switch Q1 is turned off because the sensing voltage Vsns is higher than the reference voltage Vref4 of the first amplifier A1, but lower than the reference voltage Vref3 of the second amplifier A2 (for example, Vref4<Vsns<Vref3).

When the voltage level of the ripple current signal VR is equal to or higher than the third level LV3, but lower than the fourth level LV4 (for example, LV3≤VR<LV4), the first to third light emitting device arrays D1 to D3 are turned on and, as such, may emit light. In this case, a third drain voltage "VR-LV3" may be applied to the drain of the third switch Q3. Current flowing through the first to third light emitting device arrays D1 to D3 may flow through the third channel line CH3 and third switch Q3. For example, the third level LV3 may be equal to a sum of the operating voltages VF1 to VF3 of the first to third light emitting device arrays D1 to D3 (for example, LV3=VF1+VF2+VF3).

In this case, no current flows through the first and second switches Q1 and Q2. This is because the third switch Q3 is turned on, but the first and second switches Q1 and Q2 are turned off because the sensing voltage Vsns is higher than the reference voltage Vref3 of the second amplifier A2, but lower than the reference voltage Vref2 of the third amplifier A3 (for example, Vref3<Vsns<Vref2).

When the voltage level of the ripple current signal VR is equal to or higher than the fourth level LV4 (for example, LV4≤VR), the first to fourth light emitting device arrays D1 to D4 are turned on and, as such, may emit light. In this case, a fourth drain voltage "VR-LV4" may be applied to the drain of the fourth switch Q4. Current flowing through the first to fourth light emitting device arrays D1 to D4 may flow through the fourth switch Q4. For example, the fourth level LV4 may be equal to a sum of the operating voltages VF1 to VF4 of the first to fourth light emitting device arrays D1 to D4 (for example, LV4=VF1+VF2+VF3+VF4).

In this case, no current flows through the first to third switches Q1 to Q3. This is because the fourth switch Q4 is turned on, but the first to third switches Q1 to Q3 are turned off because the sensing voltage Vsns is higher than the reference voltage Vref2 of the third amplifier A3, but lower than the reference voltage Vref1 of the fourth amplifier A4 (for example, Vref2<Vsns<Vref1).

The temperature adapter 240 measures the temperature of the illumination system 100. Based on the result of the measurement, the temperature adapter 240 adjusts the level of the selection voltage VREF supplied to the sequential driving controller 230 and, as such, may control the brightness of the light emitting unit 101.

Figure 11:
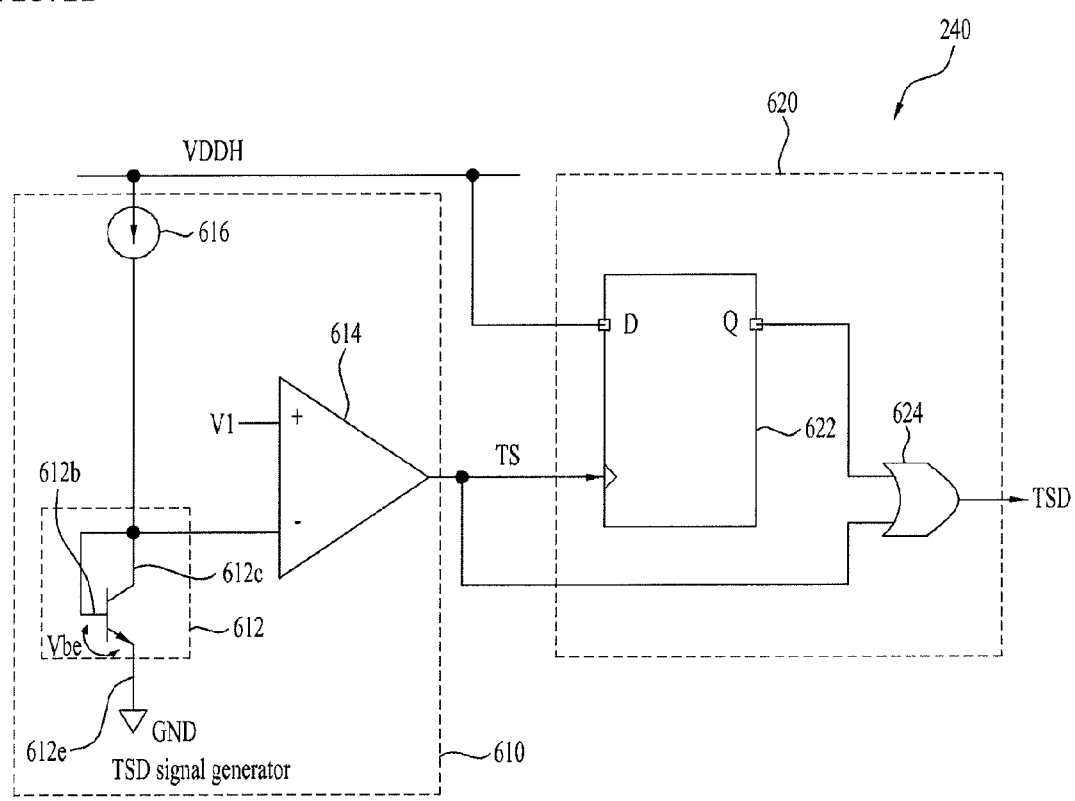
FIG. 11 is a diagram illustrating an embodiment of a temperature adapter illustrated in FIG. 2.

Turning now to FIG. 11, FIG. 11 illustrates an embodiment of the temperature adapter 240 illustrated in FIG. 2.

The temperature adapter 240 includes a temperature sensing unit 610 and a thermal shutdown signal generator 620.

The temperature sensing unit 610 senses the temperature of the illumination system 100 and compares the sensed temperature with a reference temperature. Based on the result of comparison, the temperature sensing unit 610 may generate a temperature sensing signal TS. In this case, the temperature sensed by the temperature sensing unit 610 may be the temperature of the illumination system 100.

For example, the temperature sensing unit 610 may include a temperature sensing transistor 612, a comparator 614, and a constant current source 616.

The temperature sensing transistor 612 may be implemented as a bipolar transistor. The voltage between the base and emitter of the temperature sensing transistor 612, namely, a base-emitter voltage Vbe, may be varied in accordance with variation in the temperature of the illumination system 100. For example, as the temperature of the illumination system 100 increases, the base-emitter voltage Vbe of the temperature sensing transistor 612 may drop.

The temperature sensing transistor 612 includes a base 612b, a collector 612c connected to the base 612b, and an emitter 612e connected to the ground GND.

The comparator 614 may compare the base-emitter voltage Vbe of the temperature sensing transistor 612 with a reference voltage V1, and may generate a temperature sensing signal TS according to the result of comparison.

The reference voltage V1 may correspond to a reference temperature that is a set temperature desired by the user.

The comparator 614 may output a temperature sensing signal TS having a first level (for example, a high level) when the base-emitter voltage Vbe of the temperature sensing transistor 612 is lower than or equal to the reference voltage V1 (for example, Vbe≤V1). The temperature sensing signal TS having the first level may represent the case in which the temperature of the illumination system 100 is equal to or higher than the reference temperature set by the user.

On the other hand, when the base-emitter voltage Vbe of the temperature sensing transistor 612 is higher than the reference voltage V1 (for example, Vbe>V1), the comparator 614 may output a temperature sensing signal TS having a second level (for example, a low level).

The constant current source 616 is connected between the internal voltage VDDH supplied from the power supply 210 and the collector 612 of the temperature sensing transistor 612.

The thermal shutdown signal generator 620 may generate the thermal shutdown signal TSD, based on the internal voltage VDDH and temperature sensing signal TS.

The thermal shutdown signal generator 620 may include a D-flip-flop 622 and a logic gate 624.

The D-flip-flop 622 may receive the internal voltage VDDH, and may output the received internal voltage VDDH in response to the temperature sensing signal TS. For example, the internal voltage VDDH supplied from the power supply 210 may be an input of the D-flip-flop 622, and the temperature sensing signal TS may be used as a clock signal for the D-flip-flop 622.

The logic gate 624 may logically operate the temperature sensing signal TS and an output from the D-flip-flop 622, and may generate a temperature shutdown signal TSD in accordance with the result of logical operation.

For example, the logic gate 624 may be an OR gate.

When the temperature of the illumination system 100 is equal to or higher than the reference temperature, the temperature sensing signal TS may have the first level (for example, the high level). In this case, the thermal shutdown signal TSD may have a first level (for example, a high level) in response to the temperature sensing signal TS having the first level (for example, the high level).

When the temperature shutdown signal TSD has the first level, the current adjuster 220 may select and output a lowest one of the selective voltages Vint[1] to Vint[n].

On the other hand, when the temperature of the illumination system 100 is lower than the reference temperature, the temperature sensing signal TS may have the second level (for example, the low level). In this case, however, the thermal shutdown signal TSD may be maintained at the first level (for example, the high level) because the thermal shutdown signal TSD is an output of the D-flip-flop 622. In detail, the input of the D-flip-flop 622 is the internal voltage VDDH and, as such, once the output of the D-flip-flop 622 has the first level, it is maintained at the first level, so long as power is not cut off. For toggling of the output of the D-flip-flop 622 to the second level, the internal voltage VDDH should have the second level.

When ambient temperature around the illumination system 100 is increased due to a fire, or the like and the temperature of the illumination system 100 becomes equal to or higher than the reference temperature set by the user, the current adjuster 220 outputs the lowest selection voltage in accordance with the embodiment and, as such, the brightness of the light emitting unit 101 may be decreased.

Even when the temperature of the illumination system 100 is decreased, the light emitting unit 101 may be maintained at a low brightness state without being returned to an original brightness state so long as the internal voltage VDDH is not toggled to a low level, that is, so long as the illumination system 100 is not turned off.

The light emitting unit 101 may be returned to an original brightness state only when the internal voltage VDDH is toggled to a low level, that is, when the illumination system 100 is turned off, and then again turned on.

Figure 6:
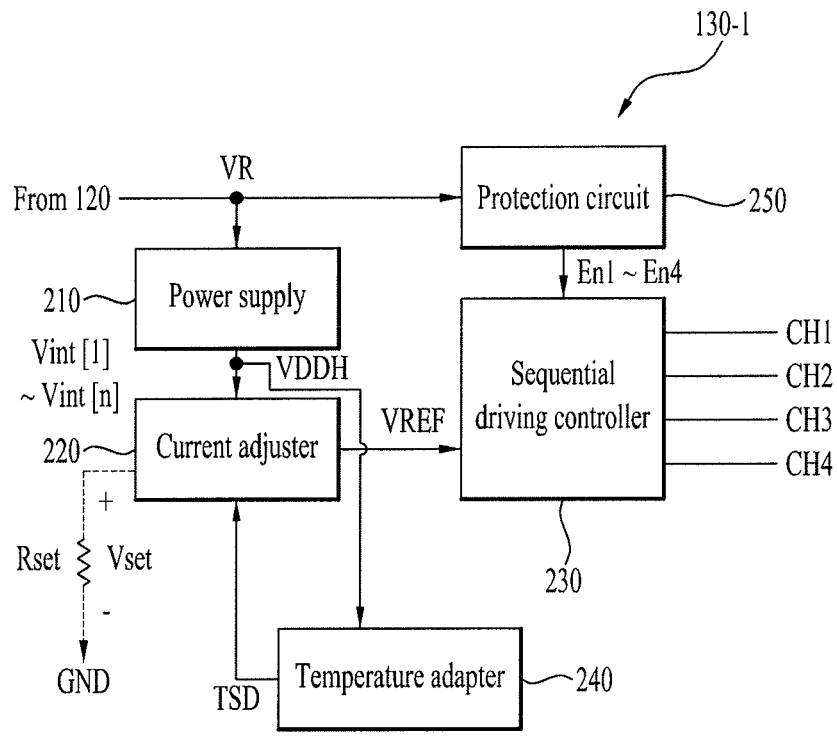
FIG. 6 is a diagram illustrating a configuration of a controller according to another embodiment.

Turning now to FIG. 6, FIG. 6 illustrates a diagram of a configuration of the controller according to another embodiment.

The same reference numerals as that of FIG. 2 designate the same constituent elements, and, as such, description of the same constituent element will not be given or will be given in brief.

The controller, which is designated by reference numeral "130-1", may further include a protection circuit 250 in addition to the controller 130 as described above with respect to FIG. 2.

When the illumination system 100 is turned on or off, the voltage level of the ripple current signal VR input to the light emitting unit 101 momentarily spikes. Under this circumstance, when the light emitting unit 101 is driven, starting from the first light emitting device array D1, a voltage higher than the voltage that the first switch Q1 can withstand is applied to the first switch Q1. This may result in damage to the first switch Q1.

The protection circuit 250 may function to protect elements of the illumination system 100 (e.g., the first switch Q1) when a momentarily excessive voltage is input upon turning-on or turning-off of the illumination system 100.

The protection circuit 250 enables or disables the amplifiers in accordance with the voltage level of the ripple current signal VR applied to the light emitting unit 101 when the illumination system 100 is turned on.

That is, the protection circuit 250 detects the voltage level of the ripple current signal VR at a time when the ripple current signal VR is applied to the light emitting unit 101 after the illumination system 100 is turned on. The protection circuit 250 then compares the detected voltage level with a predetermined first reference voltage RV1, and sequentially enables or disables the amplifiers A1 to A4 in accordance with the result of comparison.

For example, when the voltage of the ripple current signal VR is lower than the first reference voltage RV1, the protection circuit 250 disables all amplifiers A1 to A4.

In this case, the predetermined first reference voltage RV1 may be lower than a voltage capable of driving one light emitting device array (for example, D4) included in the light emitting unit 101. For example, the first reference voltage RV1 may be lower than a drive voltage of the light emitting device array D4, which is a last one of the series-connected light emitting device arrays D1 to D4.

For example, the predetermined first reference voltage may be lower than the drive voltage of the last light emitting device array D4 (for example, 65V) by 10 to 20V. It should be appreciated that embodiments are not necessarily limited to the above-described condition.

When the voltage of the ripple current signal VR is higher than a predetermined second reference voltage, the protection circuit 250 disables all amplifiers A1 to A4.

In this case, the predetermined second reference voltage may be higher than a sum of drive voltages of all light emitting arrays D1 to D4 included in the light emitting unit 101.

For example, the predetermined second reference voltage may be higher than the sum of the drive voltages of all light emitting device arrays D1 to D4 by 100V or more. It should be appreciated that embodiments are not necessarily limited to the above-described condition.

The protection circuit 250 may enable the amplifiers A1 to A4 in accordance with a first order when the voltage level of the ripple current signal VR at the time the illumination system 100 is turned on is equal to or higher than the first reference voltage, but lower than or equal to the second reference voltage.

For example, the first order is reverse to a second order. The second order may be a sequential arrangement order A1-A2-A3-A4 of the amplifiers A1 to A4 corresponding to the series-connected light emitting device arrays D1 to D4.

For example, the first order may be an order A4-A3-A2-A1, which is reverse to the sequential arrangement order A1-A2-A3-A4 of the amplifiers A1 to A4 corresponding to the series-connected light emitting device arrays D1 to D4.

When the voltage level of the ripple current signal VR at the time the illumination system 100 is turned off is lower than the first reference voltage or higher than the second reference voltage, the protection circuit 250 may enable the amplifiers A1 to A4 in accordance with the second order. The second order may be reverse to the first order.

Figure 7:
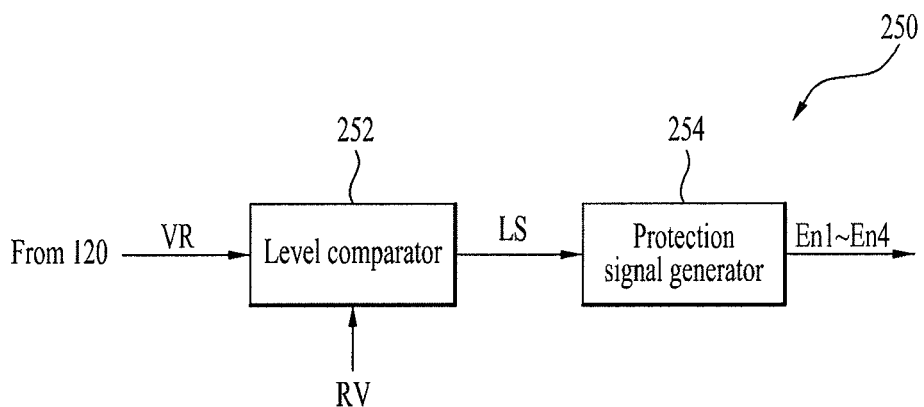
FIG. 7 is a diagram illustrating an embodiment of a protection circuit illustrated in FIG. 6.

Turning now to FIG. 7, FIG. 7 illustrates an embodiment of the protection circuit 250 illustrated in FIG. 6.

The protection circuit 250 may include a level comparator 252 and a protection signal generator 254.

The level comparator 252 detects the voltage level of the ripple current signal VR at a time when the illumination system 100 is turned on or off. The level comparator 252 then compares the detected voltage level of the ripple current signal VR with a predetermined reference voltage RV, and outputs a comparison signal LS according to the result of comparison.

The case when the illumination system 100 is turned on may be the case when the comparison signal LS transitions from a second level (for example, a low level) to a first level (for example, a high level). On the other hand, the case when the illumination system 100 is turned off may be the case when the comparison signal LS transitions from the first level to the second level. It should be appreciated that embodiments are not necessarily limited to the above-described conditions.

For example, when the detected voltage level of the ripple current signal VR is equal to or higher than the predetermined reference voltage, the level comparator 252 may output a detection signal having a first level (for example, a high level) as the comparison signal LS.

On the other hand, when the detected voltage level of the ripple current signal VR is lower than the predetermined reference voltage, the level comparator 252 may output a detection signal having a, second level (for example, a low level) as the comparison signal LS.

Based on the detection signal LS, the protection signal generator 254 may generate protection signals En1 to En4 capable of enabling or disabling the amplifiers.

For example, when the detection signal LS has the first level at a turning-on time of the illumination system 100, the protection signal generator 254 may output protection signals En1 to En4 to enable the amplifiers A1 to A4 in accordance with a first order.

For example, when the internal voltage VDDH transitions from a second level (for example, a low level) to a first level (for example, a high level), and the detection signal LS has the first level, the protection signal generator 254 may output the protection signals En1 to En4 to enable the amplifiers A1 to A4 in accordance with the first order.

On the other hand, when the detection signal LS has the first level at a turning-off time of the illumination system 100, the protection signal generator 254 may output protection signals En1 to En4 to enable the amplifiers A1 to A4 in accordance with a second order.

For example, when the internal voltage VDDH transitions from the first level (for example, the high level) to the second level (for example, the low level), and the detection signal LS has the first level, the protection signal generator 254 may output the protection signals En1 to En4 to enable the amplifiers A1 to A4 in accordance with the second order.

For example, the protection signal generator 254 may be implemented as a delay circuit to perform delay for a predetermined time.

There may be a predetermined time difference or time delay between neighboring enable timing points or disable timing points of the protection signals En1 to En4.

For example, the predetermined time difference or time delay may be 1 to 4 microseconds.

For example, when the detection signal LS has the first level at a turning-on time of the illumination system 100, the fourth protection signal En4 may be enabled at a first timing point, the third protection signal En3 may be enabled at a second timing point, the second protection signal En2 may be enabled at a third timing point, and the first protection signal En1 may be enabled at a fourth timing point.

The difference between neighboring enable timing points (for example, first and second timing points) may be, for example, 1 to 4 microseconds.

On the other hand when the detection signal LS has the first level at a turning-off time of the illumination system 100, the first protection signal En1 may be disabled at a fifth timing point, the second protection signal En2 may be disabled at a sixth timing point, the third protection signal En3 may be disabled at a seventh timing point, and the fourth protection signal En4 may be disabled at an eighth timing point.

The difference between neighboring enable timing points (for example, fifth and sixth timing points) may be 1 to 4 microseconds. In this case, the timing point order may be from the first timing point to the eighth timing point.

Accordingly, it may be possible to prevent the switches (for example, Q1) from being damaged even when the illumination system 100 is turned on under the condition that the voltage of the ripple current signal VR is considerably higher than the maximum level MAX thereof.

For example, the switches may be protected from damage because all switches Q1 to Q4 are maintained in an OFF state, even when the ripple current signal VR has a voltage level higher than the maximum level MAX of the AC voltage by 100V or more at the time the illumination system is turned on. Furthermore, even when the ripple current signal VR momentarily has an excessive voltage due to a voltage surge, it may be possible to prevent the switches (for example, Q1) from being damaged because all switches Q1 to Q4 are maintained in an OFF state.

Similarly, even when the illumination system 100 is turned off in response to the ripple current signal VR being at its maximum voltage level, MAX, it may be possible to prevent the first switch Q1 from being damaged because the amplifiers (for example, A1 to A4) are disabled in the second order A1-A2-A3-A4.

In some embodiments, it may be possible to adjust the amount of light of the light emitting unit 101 by adjusting current flowing through the light emitting unit 101 based on the setting voltage Vset determined by the external resistor Rset.

In some embodiments, it may be possible to achieve an improvement in AC power noise tolerance by preventing the selection voltage VREF from being influenced by AC power noise (for example, fluctuation noise).

In some embodiments, it may be possible to prevent the illumination system 100 from being turned off or flickering in an abnormal situation such as a fire, and to enable the illumination system 100 to emit a normal amount of light when turned on after the illumination system 100 is turned off.

The embodiments as described above may include particular features, structures, or characteristics, but not every embodiment necessarily includes the particular features, structures, or characteristics.

Furthermore, the particular features, structures or characteristics in each embodiment may be combined in any suitable manner, as would be apparent to one of ordinary skill in the art from this disclosure, in one or more embodiments. Therefore, combinations of features of different embodiments are meant to be within the scope of the invention.

What is claimed is:

1. A light emitting device driving apparatus for controlling a light emitting unit including a plurality of light emitting device arrays connected in series, comprising:
    a rectifier for rectifying an AC signal and outputting a ripple current signal based at least in part on the rectified AC signal;
    a current adjuster for outputting a selection voltage;
    a power supply for receiving the ripple current signal and generating an internal voltage and a plurality of selective voltages; and
    a sequential driving controller connected to channel lines, the channel lines connected to respective output terminals of the light emitting device arrays, wherein the sequential driving controller:
        selectively establishes current paths between the light emitting device arrays and the channel lines based on a voltage level of the ripple current signal; and
        adjusts an intensity of current flowing through the channel lines based on the selection voltage,
    wherein the current adjuster:
    performs analog-digital conversion upon a setting voltage wherein the setting voltage is a voltage divided from the internal voltage and the divided voltage is generated based on an external resistor;
    generates a digital value according to a result of the analog-digital conversion; and
    outputs one of the plurality of selective voltages as the selection voltage based on the digital value.

2. The light emitting device driving apparatus according to claim 1, wherein:
    the current adjuster comprises:
        an external resistor connection terminal connected to an external resistor;
        an internal resistor connected, at a first end thereof, to the external resistor connection terminal while being connected, the internal resistor receiving the internal voltage at a second end thereof;
        an analog-digital converter for performing the analog-digital conversion upon the setting voltage and generating the digital value; and
        a selector for selecting one of the plurality of selective voltages based on the digital value and outputting the selected voltage; and
    wherein the setting voltage is a voltage divided from the internal voltage in accordance with a voltage division ratio between the external resistor and the internal resistor.

3. A light emitting device driving apparatus for controlling a light emitting unit including a plurality of light emitting device arrays connected in series, comprising:
    a rectifier for rectifying an AC signal and outputting a ripple current signal based at least in part on the rectified AC signal;
    a sequential driving controller comprising switches connected to respective output terminals of the light emitting device arrays based on a voltage level of the ripple current signal, and amplifiers for controlling the switches;
    a power supply for receiving the ripple current signal and generating an internal voltage and a plurality of selective voltages; and
    a protection circuit for:
        comparing, with a predetermined reference voltage, the voltage level of the ripple current signal at a time when at least one of the ripple current signal being supplied to the light emitting unit or the supply of the ripple current signal being cut off; and
        enabling or disabling the amplifiers in accordance with a result of the comparison.

4. The light emitting device driving apparatus according to claim 3, wherein:
    the protection circuit enables the amplifiers in a first sequence when the voltage level of the ripple current signal is greater than or equal to a predetermined first reference voltage, and less than or equal to a predetermined second reference voltage at a time when the ripple current signal is supplied to the light emitting unit;
    the first sequence is reverse to a second sequence; and
    the second sequence is a sequential arrangement order of the amplifiers corresponding to the series-connected light emitting arrays.

5. The light emitting device driving apparatus according to claim 4, wherein the protection circuit disables all of the amplifiers when the voltage level of the ripple current signal is less than the predetermined first reference voltage or greater than the predetermined second reference voltage.

6. The light emitting device driving apparatus according to claim 4, wherein the predetermined first reference voltage is greater than an operating voltage of one of the light emitting device arrays, and the predetermined second reference voltage is less than a sum of operating voltages of the light emitting device arrays.

7. The light emitting device driving apparatus according to claim 3, wherein:
    the protection circuit disables the amplifiers in accordance with a predetermined second sequence when the voltage level of the ripple current signal is less than the predetermined first reference voltage, but greater than the predetermined second reference voltage at a time when the supply of the ripple current signal is cut off; and
    the predetermined second sequence is a sequential arrangement order of the amplifiers corresponding to the series-connected light emitting device arrays.

8. The light emitting device driving apparatus according to claim 7, wherein a predetermined time difference is present between neighboring enable timing points of the amplifiers.

9. The light emitting device driving apparatus according to claim 8, wherein the predetermined time difference is 1 to 4 microseconds.

10. The light emitting device driving apparatus according to claim 3, further comprising:
a current adjuster for performing analog-digital conversion upon a setting voltage, generating a digital value according to a result of the analog-digital conversion, and outputting one of the plurality of selective voltages as a selection voltage based on the digital value.

11. The light emitting device driving apparatus according to claim 10, wherein:
the sequential driving controller further comprises a sensing resistor connected to a first node; and
each of the switches comprises a source connected to the first node, a drain connected to a corresponding one of the output terminals of the light emitting device arrays, and a gate controlled by a corresponding one of the amplifiers.

12. The light emitting device driving apparatus according to claim 11, wherein each of the amplifiers comprises:
a first input terminal connected to the first node;
a second input terminal, to which a corresponding one of a plurality of reference voltages has at least one different voltage level; and
an output terminal for comparing a voltage at the first input terminal and a voltage at the second input terminal and outputting a comparison signal according to a result of the comparison.

13. The light emitting device driving apparatus according to claim 12, wherein the sequential driving controller further comprises a reference voltage generator for generating the plurality of reference voltages having different voltage levels based on the selection voltage output from the current adjuster.

14. The light emitting device driving apparatus according to claim 10, further comprising:
a temperature adapter comprising a temperature sensing transistor having a base-emitter voltage varying in accordance with a variation in temperature, wherein the temperature adapter outputs a thermal shutdown signal based on the base-emitter voltage of the temperature sensing transistor and the internal voltage, and wherein the current adjuster selectively outputs one of the plurality of selective voltages based on the thermal shutdown signal.

15. The light emitting device driving apparatus according to claim 14, wherein the temperature adapter further comprises:
a comparator for comparing the base-emitter voltage of the temperature sensing transistor with a first voltage and outputting a temperature sensing signal according to a result of the comparison;
a D-flip-flop for receiving the internal voltage and outputting the received internal voltage in response to the temperature sensing signal; and
a logic gate for logically operating the output from the D-flip-flop and the temperature sensing signal, and outputting the thermal shutdown signal in accordance with a result of the logical operation.

16. The light emitting device driving apparatus according to claim 15, wherein the logic gate is an OR gate.

17. An illumination system comprising:
a light emitting unit comprising light emitting device arrays connected in series; and
a light emitting device driving apparatus for controlling the light emitting unit,
wherein the light emitting device driving apparatus comprises:
a rectifier for rectifying an AC signal and outputting a ripple current signal based at least in part on the AC signal;
a power supply for receiving the ripple current signal and generating an internal voltage and a plurality of selective voltages;
a current adjuster for outputting a selection voltage; and
a sequential driving controller connected to channel lines connected to respective output terminals of the light emitting device arrays, wherein the sequential driving controller selectively establishes current paths between the light emitting device arrays and the channel lines based on a voltage level of the ripple current signal, and adjusts an intensity of current flowing through the channel lines based on the selection voltage;
wherein the current adjuster performs analog-digital conversion upon a setting voltage, generates a digital value according to a result of the analog-digital conversion, and outputs one of the plurality of selective voltages as the selection voltage, based on the digital value, wherein the setting voltage is a voltage divided from the internal voltage and the divided voltage is generated based on an external resistor.

* * * * *